United States Patent [19]
Maupin et al.

[11] Patent Number: 5,705,132
[45] Date of Patent: Jan. 6, 1998

[54] COMBUSTION SYNTHESIS CONTINUOUS FLOW REACTOR

[75] Inventors: Gary D. Maupin, Richland; Lawrence A. Chick, West Richland; Randal P. Kurosky, Maple Valley, all of Wash.

[73] Assignee: Battelle Memorial Institute, Richland, Wash.

[21] Appl. No.: 366,941

[22] Filed: Dec. 30, 1994

[51] Int. Cl.$^6$ ............................................. F28D 21/00
[52] U.S. Cl. ............................................. 422/198; 261/79.2
[58] Field of Search ........................... 422/198; 261/79.2

[56] References Cited

U.S. PATENT DOCUMENTS

| | | |
|---|---|---|
| 4,734,109 | 3/1988 | Cox ............................... 261/79.2 |
| 4,784,810 | 11/1988 | Jorzyk et al. .................. 261/79.2 |
| 4,818,295 | 4/1989 | Converse et al. ............. 261/79.2 |
| 4,909,811 | 3/1990 | Dodson ........................... 261/79.2 |
| 5,059,357 | 10/1991 | Wolf et al. ..................... 261/79.2 |
| 5,061,682 | 10/1991 | Aksay et al. .................. 505/1 |
| 5,114,702 | 5/1992 | Pederson et al. . |

*Primary Examiner*—Timothy McMahon
*Attorney, Agent, or Firm*—Paul W. Zimmerman

[57] ABSTRACT

The present invention is a reactor for combustion synthesis of inorganic powders. The reactor includes a reaction vessel having a length and a first end and a second end. The reaction vessel further has a solution inlet and a carrier gas inlet. The reactor further has a heater for heating both the solution and the carrier gas. In a preferred embodiment, the reaction vessel is heated and the solution is in contact with the heated reaction vessel. It is further preferred that the reaction vessel be cylindrical and that the carrier gas is introduced tangentially into the reaction vessel so that the solution flows helically along the interior wall of the reaction vessel. As the solution evaporates and combustion produces inorganic material powder, the carrier gas entrains the powder and carries it out of the reactor.

12 Claims, 7 Drawing Sheets

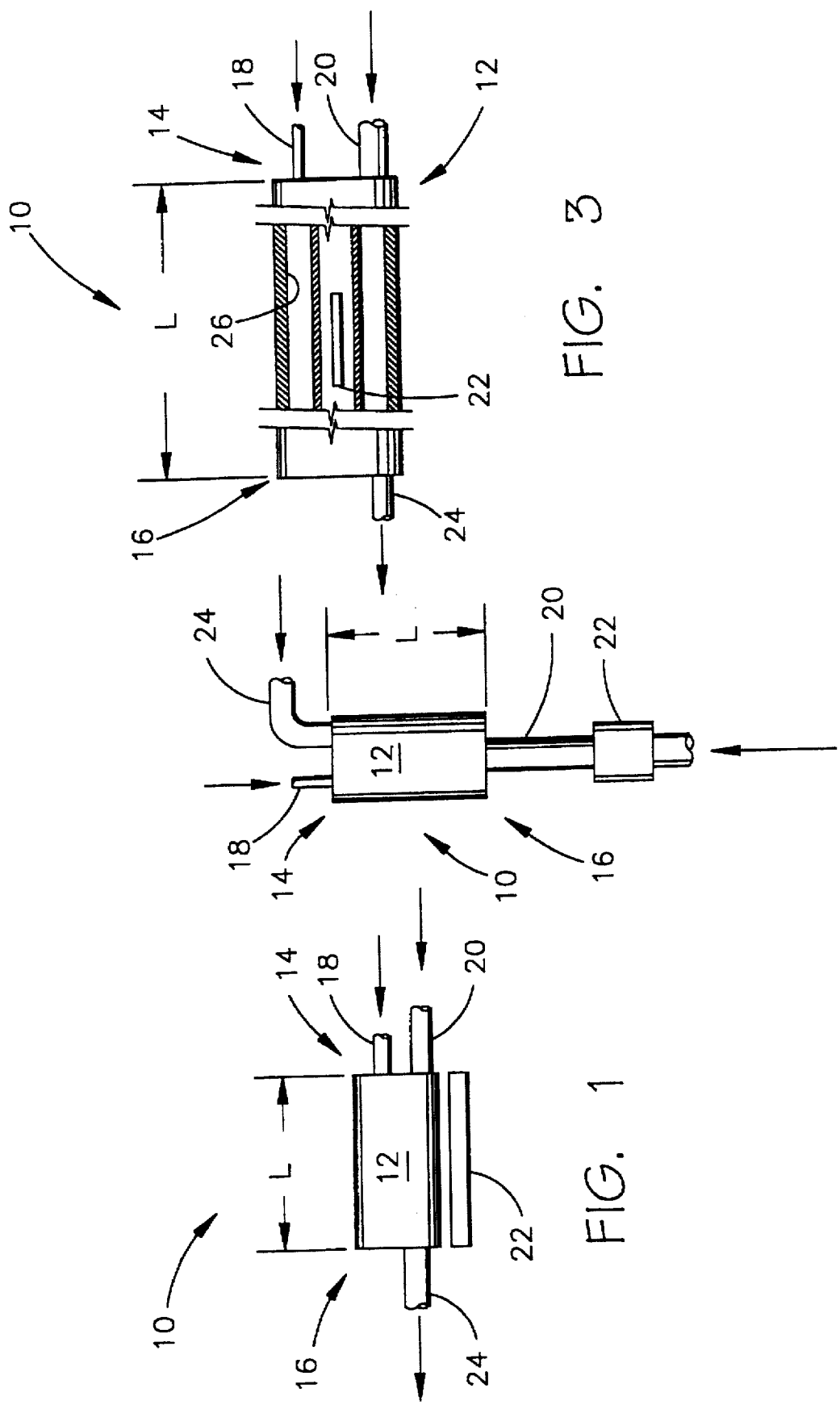

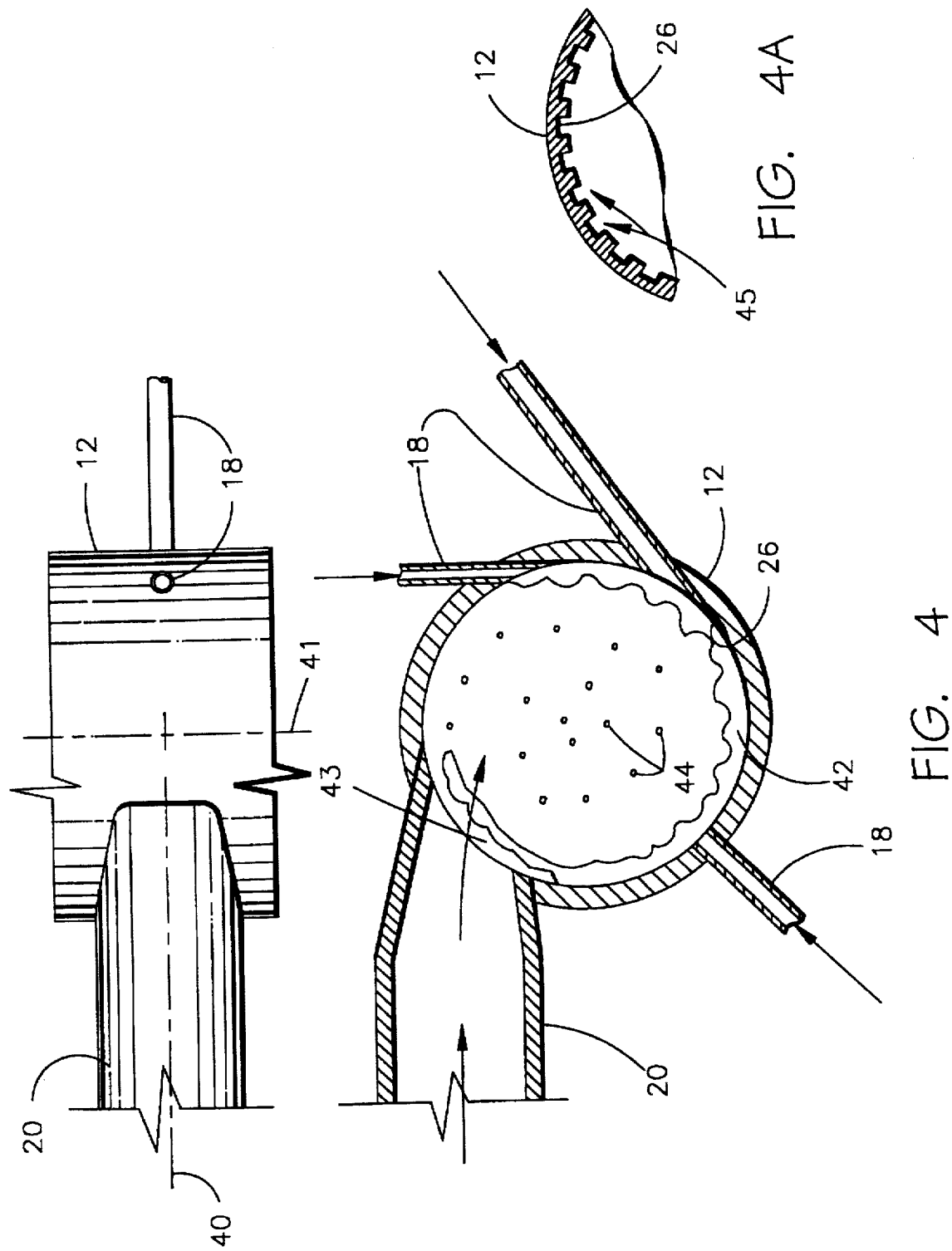

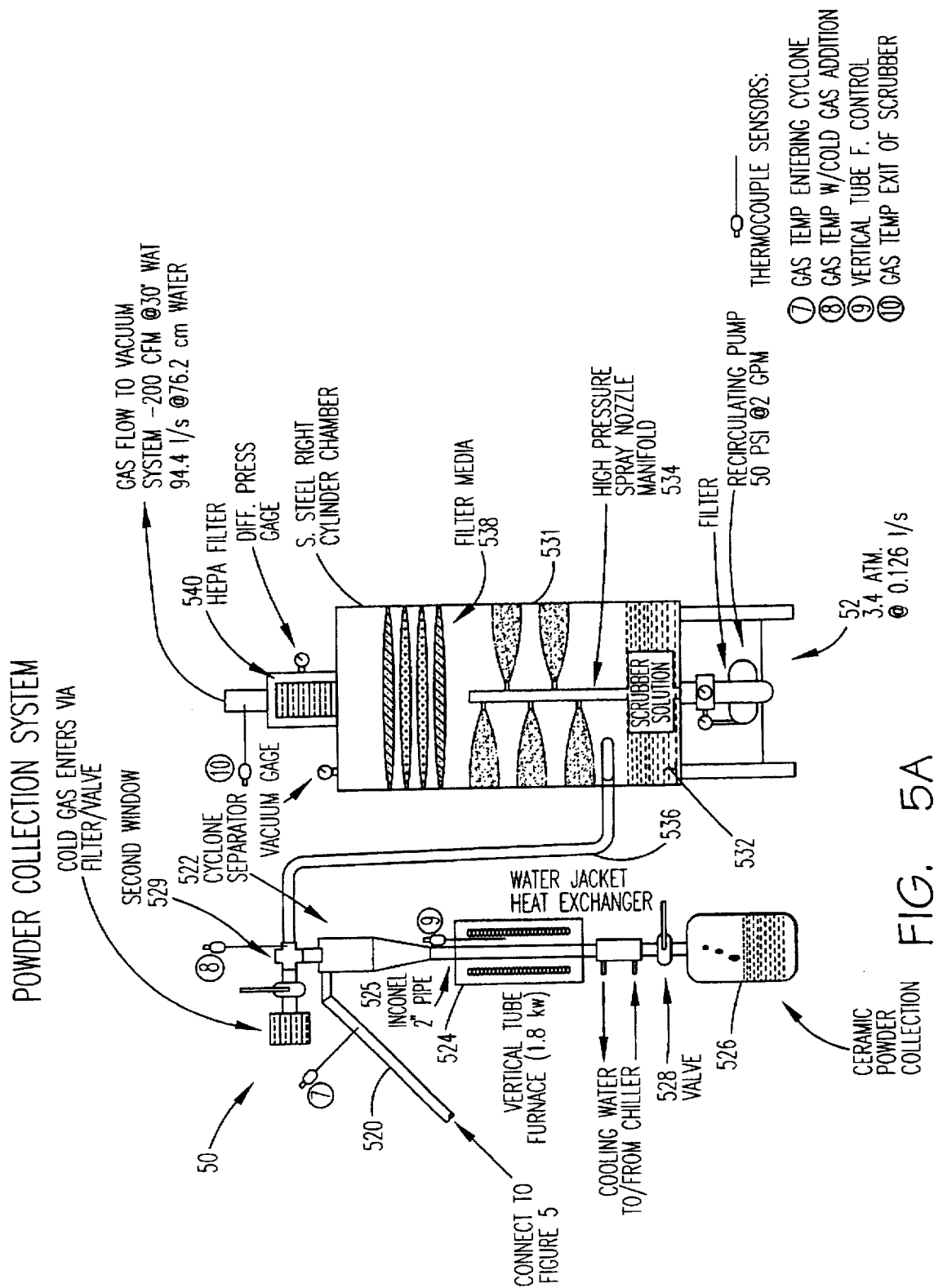

COMBUSTION SYNTHESIS CONTINUOUS FLOW REACTOR

COMBUSTION SYNTHESIS CONTINUOUS FLOW REACTOR

This invention was made with Government support under Contract DE-AC06-76RLO 1830 awarded by the U.S. Department of Energy. The Government has certain rights in the invention.

FIELD OF THE INVENTION

The present invention relates generally to an apparatus for combustion synthesis. More specifically, the apparatus is a continuous flow reactor having inlets for a solution and a carrier gas, and further having a heater for achieving combustion synthesis of the solution. The carrier gas removes synthesized product powder from the reactor.

BACKGROUND OF THE INVENTION

Preparation of inorganic materials is used in metallurgy, ceramics and many other industries. Certain inorganic materials are made via a combustion synthesis chemical reaction, including but not limited to metal oxide ceramic powders; for example, chromite powders. A method of preparation of metal oxide ceramic powders from a combustible amino acid compound is found in U.S. Pat. No. 5,114,702, L R Pederson, L A Chick, and G J Exarhos, issued May 19, 1992. The method begins with making an aqueous solution of a metal salt and a combustible amino acid compound. The aqueous solution is evaporated, forming a concentrate that is further heated until autoignition combusts the evaporated solution to form the metal oxide powder.

The apparatus described by Pederson et. al. includes a beaker that holds the solution during evaporation. Concentrate is removed from the beaker and placed on a plate heated to about 200° C. to achieve autoignition and obtain the desired metal oxide powder. Such an apparatus is useful in a laboratory wherein small amounts (less than about 25 grams) of metal oxide powder is needed. However, one skilled in the art of producing metal oxide powders will appreciate that for larger amounts, for example greater than about 250 grams, this batch apparatus would be slow and labor intensive to operate. Moreover, issues of safety, energy efficiency, and environmental impact may also be of concern relative to a beaker type batch process.

An apparatus for continuous combustion synthesis of ceramic powders is shown in U.S. Pat. No. 5,061,682 to Aksay et al., Oct. 29, 1991. In this apparatus, ceramic precursors are formed into droplets with a centrifugal atomizer. The droplets are desolvated by heating in a spray dryer, then the desolvated droplets (now solid particles) are further heated in a falling particle furnace to initiate an anionic oxidation-reduction reaction which is an exothermic reaction characterized by sparking or flashing of the particles to form ceramic powders. This apparatus is useful when the organic carbohydrate is sucrose that can be desolvated (evaporated) to dry particles, but is not as useful for an organic including but not limited to glycine that does not fully desolvate and retains a "stickiness" after desolvation.

Therefore, it is an object of the present invention to provide a combustion synthesis continuous flow reactor that produces inorganic material powders in less time, and with less labor intensive operation.

It is a further object of the present invention to provide a combustion synthesis continuous flow reactor that produces inorganic material powders more safely, using less energy per unit of powder produced and with reduced environmental impact.

It is yet a further object of the present invention to provide a combustion synthesis continuous flow reactor that can accept a variety of organic materials, including but not limited to carbohydrates, for example sucrose, amino acids for example glycine, and urea.

SUMMARY OF THE INVENTION

The present invention is a reactor for combustion synthesis of inorganic powders. The reactor includes a reaction vessel having a length and a first end and a second end. The reaction vessel further has a solution inlet and a carrier gas inlet. The reactor further has a heater for heating both the solution and the carrier gas. In a preferred embodiment, the reaction vessel is heated and the solution is in contact with the heated reaction vessel. It is further preferred that the reaction vessel be cylindrical and that the carrier gas is introduced tangentially into the reaction vessel so that the solution flows helically along the interior wall of the reaction vessel. As the solution evaporates and combustion produces inorganic material powder, the carrier gas entrains the powder and carries it out of the reactor.

Inorganic material powders that may be made with or in the apparatus of the present invention include, but are not limited to, materials set forth in Pedersen et al. and Aksay et al. Specifically included are chromites, manganites, high temperature superconductors, yttrium aluminum garnet, yttrium iron garnet, cobalites, cerates, titanates, ferrites, cermets, metals for example copper, iron, nickel, cobalt, chromium and manganese, and composites.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 1 is a schematic of a horizontal embodiment of the present invention.

FIG. 2 is a schematic of a vertical embodiment of the present invention.

FIG. 3 is a schematic of an internally heated horizontal embodiment of the present invention.

FIG. 4 is a detail of the connection of the carrier gas inlet and solution inlet to the reaction vessel.

FIG. 4a is a cross-section of a reaction vessel with recesses.

FIG. 5a is a continuation of the schematic of FIG. 5.

DESCRIPTION OF THE PREFERRED EMBODIMENT(S)

Figure 5:
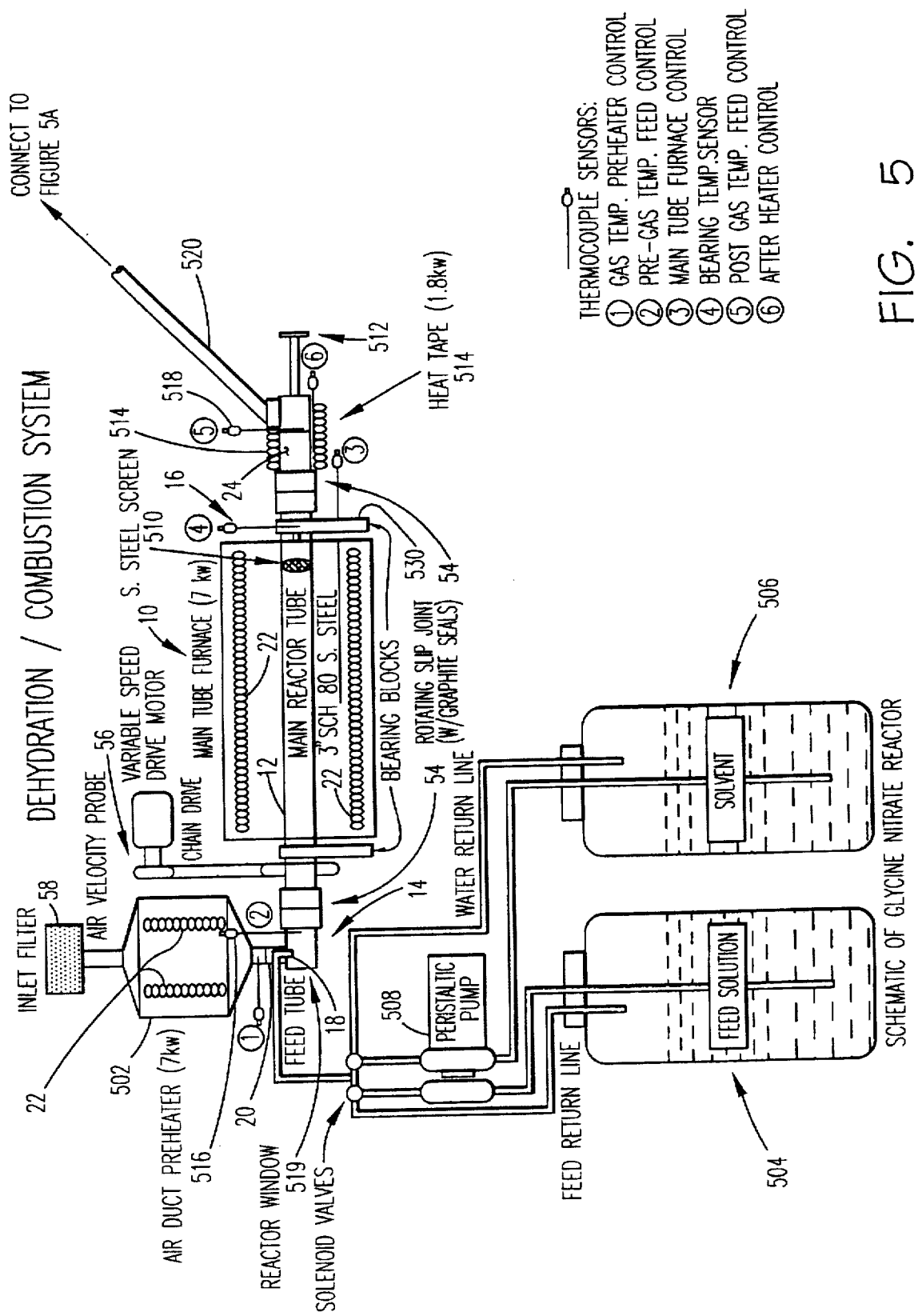
FIG. 5 is a schematic of a system containing the present invention.

The present invention of a combustion synthesis continuous flow reactor is shown in FIG. 1. The reactor 10 includes a reaction vessel 12 having a length L and a first end 14 and a second end 16. The reaction vessel 12 further has a solution inlet be and a carrier gas inlet 20. The reactor 10 further has a heater 22 for heating both the solution and the carrier gas. The length L and a heating rate from the heater 22 are selected so that solution entering the solution inlet 18 is within the reaction vessel 12 for a time sufficient to evaporate and combust the solution so that inorganic material powder is entrained in the carrier gas and removed from the reaction vessel 12 through outlet 24. In FIG. 1, the heater 22 is located outside the reaction vessel 12 so that the reaction vessel 12 is heated and subsequently heats carrier gas and solution. In FIG. 2, the heater 22 is located on the carrier gas inlet 20 so that the carrier gas is heated and subsequently heats the solution and reaction vessel 12. Also, FIG. 1 depicts a horizontal orientation of the reactor 10 whereas FIG. 2 depicts a vertical orientation of the reactor 10. Orientation of the reactor 10 is not critical to the invention and other orientations of the reactor 10 may be selected for particular applications.

The reactor 10 may be heated internally as shown in FIG. 3. It will be further appreciated by one skilled in the art of reactor design that any cross section of reaction vessel 12 may be used.

In a preferred embodiment, the reaction vessel 12 is heated and the solution admitted through at least one solution inlet 18 and is in contact with the heated reaction vessel. It is further preferred that the solution be maintained in the reaction vessel 12 for a sufficient residence time to permit desolvation and combustion reaction. Initially, it was found that the evaporating solution 42 (FIG. 4) would quickly slide on a gaseous phase 43 toward an end of the reaction vessel drastically reducing the residence time of the evaporating solution 42 within the reactor. Hence, an excessively long reactor vessel 12 would be needed to obtain the desired inorganic material powder.

The problem of insufficient residence time is overcome in a preferred embodiment as shown in FIG. 4 by using a cylindrical cross section reaction vessel 12 and by connecting the carrier gas inlet 20 to the reaction vessel 12 so that the longitudinal axis 40 of the carrier gas inlet 20 is substantially perpendicular to the longitudinal axis 41 of the reaction vessel 12. It is preferred to have a single carrier gas inlet 20, but multiple carrier gas inlets 20 may be used. The carrier gas then flows tangentially and at sufficiently high velocity that the solution 42 flows with the carrier gas in a helical path or vortex along the inner surface 26. As the solution 42 reaches its boiling point, a gaseous phase 43 is created between the inner surface 26 and the solution 42, thereby breaking contact between the solution 42 and the inner surface 26. The momentum of the carrier gas vortex maintains the evaporating solution 42 in a helical path so that the evaporating solution 42 is maintained within the reactor vessel 12 for sufficient residence time to undergo the chemical reaction of combustion and synthesize the desired inorganic material powder 44. The inorganic material powder 44 is entrained in the carrier gas flow and carried from the reaction vessel 12.

In addition to achieving sufficient residence time, the carrier gas vortex is believed to flatten the solution 42 stream(s) over the inner surface 26 of the reaction vessel 12 for improved heat transfer from the inner surface 26 to the solution thereon. It appears that the surface tension of the solution may tend to make the solution 42 flow in at least one stream rather than spread sheetlike over the inner surface 26.

Alternatively, the solution 42 stream(s) may be spread or flattened and flowed in a helical pattern by rotating the reaction vessel 12 at high speeds. However, in order to maintain momentum contact between the inner surface 26 and the evaporating solution 42 with the gaseous phase 43 therebetween, the rate of rotation of the reaction vessel 12 may be excessive; hence, this alternative embodiment is not preferred.

Returning to a preferred embodiment of relying on the carrier gas to control spreading and flow of the solution, it will be apparent to one skilled in the art of fluid handling equipment that various design parameters are interdependent. Specifically, the equivalent or hydraulic radius diameter of the reaction vessel 12, the desired rate of production of inorganic material powder, and desired cost of equipment will determine hydraulic diameter of the carrier gas inlet 20, geometric cross section of the carrier gas inlet 20, as well as a heat rate of the heater 22.

However, a particular design feature that may enhance throughput of the reactor 10 is multiple solution inlets 18. Use of multiple solution inlets 18 may result in substantially evenly spaced streams of solution 42 or with a sufficient number of solution inlets 18 a substantially sheetlike covering of solution 42 over the inner surface 26. Although it is preferred that the solution inlet(s) 18 is/are tangential to the reaction vessel 12, the tangential orientation is not necessary and the solution inlet(s) may be orthogonal or at any other angle with respect to the reaction vessel 12.

An alternative embodiment involves modification of the inner surface 26. As shown in FIG. 4*a*, recesses 45 may be used to direct the solution through the reaction vessel 12. The recesses 45 may be helical or spiral grooves for directing solution helically along the inner surface 26 of the reaction vessel 12. Alternatively, the recesses 45 may be discontinuous, for example dimples. The dimples would be filled with solution then the solution would react leaving the dimples empty. The dimples would then be re-filled. Use of discontinuous recesses causes the reactor 10 to operate in a semi-continuous manner.

The reactor be of the present invention is further combined with additional features to make a commercially robust production system as shown in FIG. 5 and FIG. 5*a*. In addition to the features previously described, further details of the reactor 10 will be set forth as well as a powder collection system 50 and a scrubber 52.

The reaction vessel 12 may be made of any material, but is preferably a material that can withstand temperatures up to from about 400° C. to about 1000° C. The temperature of combustion of the evaporated solution may be as high as about 1500° C. resulting in elevated temperatures of the reaction vessel 12. Moreover, it is desired that the reaction vessel 12 be chemically inert to the solution and the inorganic material powder product. Materials, including but not limited to metals, for example titanium, stainless steel alloys, or high temperature alloys; or ceramics, for example alumina, zirconia, and magnesium oxide, may be used. Stainless steel is preferred for its availability, machinability and chemical durability.

In the case of a horizontally oriented metal or metal alloy reaction vessel 12, the reaction vessel 12 mechanically deflects under the influence of gravity and may creep or experience a permanent deformation especially after exposure to the elevated reaction temperature. Additionally, uneven circumferential heating resulting in uneven expansion of the reaction vessel 12 would result in mechanical deformation. It is preferred to prevent or reduce deformation of the reaction vessel 12 to maintain ease of assembly and disassembly and to increase the useful life of the reaction vessel 12.

Even heating is achievable by many techniques known to those skilled in the art of vessel heating. Immersion of the reaction vessel in an elevated temperature bath, for example molten salt, or by careful design of heating elements within the heater 22, are exemplary and not intended to limit the present invention. Other methods or means of achieving even heating are known to those skilled in the art and may be selected based upon cost or other operating parameters.

Figure 6:
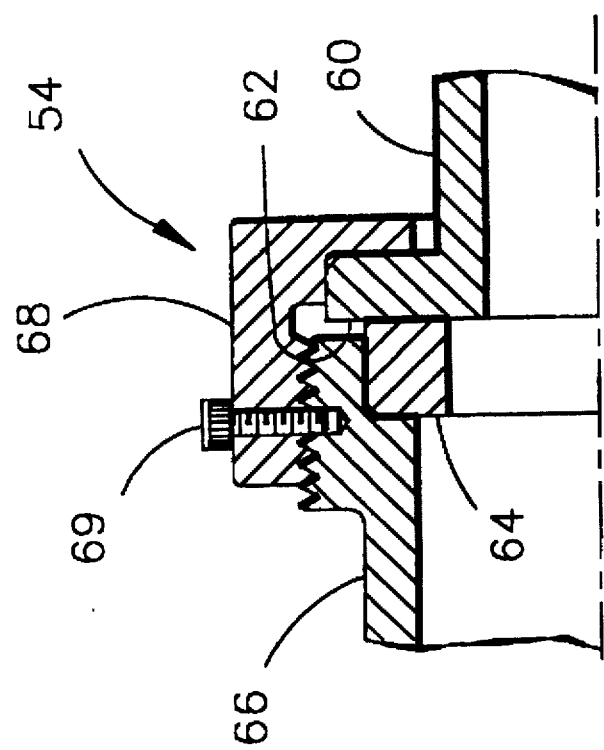
FIG. 6 is a cross section of a rotating joint.

In a preferred embodiment, deformation is prevented or reduced by rotating the reaction vessel 12 with respect to the heater 22. Accordingly, rotating slip joints 54 are provided near each end 14,16 of the reaction vessel 12. A preferred slip joint 54 as shown in FIG. 6 preferably is a modified union coupling. Instead of a cone and seat seal, the sliding member 60 has a flat face 62 contacting a seal material 64. The threaded member 66 holds the seal member 64 within the threaded and shouldered nut 68. A set screw 69 is used to lock the threaded member 66 to the threaded and shouldered nut 68. It will be apparent to one skilled in the art of slip joints that there are many slip joints to choose from according to particular design parameters.

Referring back to FIG. 5 and FIG. 5a, a mechanical drive 56 is provided to rotate the reaction vessel 12. Any mechanical drive, including but not limited to chain drive, shaft drive, friction drive or belt drive, may be used. The reaction vessel 12 is rotated from about 1 rpm to about 100 rpm, but more preferably between about 10 rpm to about 30 rpm.

Because the carrier gas flow is dominant, orientation of the reaction vessel 12 and direction of rotation of the reaction vessel 12 with respect to the vortex direction of the carrier gas are unimportant.

Any carrier gas that is chemically inert or chemically desirable in the combustion reaction may be used, including but not limited to, oxidizing gases air, or inert gases; for example, nitrogen or argon, or reducing gases including but not limited to hydrogen, carbon monoxide, or mixtures thereof. Regardless of the selection of carrier gas, it is preferred to first filter then heat the carrier gas prior to entry into the reaction vessel 12. A carrier gas filter 58 upstream of a carrier gas heater 502 is connected to the carrier gas inlet 20.

The solution inlet 18 is preferably connected to a feed solution supply 504 and a solvent supply 506. A pump 508 draws from both the solution supply 504 and the solvent supply 506, and the solution and solvent are mixed downstream of the pump 508 prior to entering the solution inlet 18.

Turning now to the outlet, or second end 16 of the reaction vessel 12, a screen 510 is optionally placed within the reaction vessel 12 near the second end 16. The screen 510 permits inorganic material powder to pass with the carrier gas, but restrains unreacted evaporating solution 42 from leaving the reaction vessel 12. The screen 510 may be a sheet perforated with holes, or may be a mesh screen. Hole size of the screen will depend upon design parameters of particular reactors, but may be about 0.5 cm. It is preferred that the screen 510 be made of the same or similar material as the reaction vessel 12. The screen 510 is cleanable, without removal, with a retractable brush assembly 512. In the event that portions of unreacted evaporating solution 42 pass the screen 510, a post reactor heater 514 heats the unreacted evaporating solution to reaction temperature.

Because of the highly exothermic nature of combustion synthesis reactions, a safety feature is added to the reactor 10. An inlet thermocouple 516 and an outlet thermocouple 518 are used to monitor inlet and outlet temperatures respectively. Upon either or both temperatures exceeding set point limits, solution feed is stopped and only solvent is continued. The solvent dilutes the solution in the reactor and slows or stops the reaction, thereby avoiding an overheating condition.

Another safety feature is the presence of a reactor window 519 permitting an operator to visually observe the reaction occurring in the reaction vessel 12.

The carrier gas may be blown through the reactor 12 under a positive pressure or drawn through the reactor 12 under negative pressure (vacuum). Vacuum is preferred to prevent release of fine particles of inorganic material powder. Carrier gas and entrained inorganic material powder are drawn from the carrier gas outlet 24 through a conduit 520 and into the powder collection system 50.

The powder collection system 50 contains a separator 522 for separating the inorganic material powder from the carrier gas. The separator may be any solid-from-gas separator, including but not limited to, cyclone separator, bag-house separator, or electrostatic separator. In addition, the powder collection system 50 has a collection heater 524 that is heated to a temperature from about 200° C. to about 1200° C., and preferably about 1000° C. for the purpose of further reacting an unreacted material in a collection reaction tube 525. The inorganic material powder is collected in a collection vessel 526. A valve 528 is used to permit exchange of the collection vessel 526 during operation. The valve 528 is preferably a rotary valve or pair of valves permitting release of powder through an air lock.

As a safety feature, a second window 529 may be added to permit operator observation of reactions in the collection reaction tube 525.

The separated carrier gas is sent through a scrubber 52 prior to exhaust. The scrubber 52 may be any scrubber. A preferred scrubber has a vessel 531 with a scrubber solution 532 that is sprayed through a nozzle manifold 534. Carrier gas from the separator 522 enters the vessel 531 through a conduit 536. The sprayed carrier gas then flows through filter media 538, and a high efficiency particle (HEPA) filter 540. After exiting the scrubber 52, the scrubbed carrier gas is drawn to a vacuum system (not shown).

EXAMPLE

A combustion synthesis reaction system was built and operated. The constructed system was built according to FIG. 5 and FIG. 5a and the description thereof.

The reactor 12 was stainless steel, 7.62 cm (3 in.) schedule 80. The collection reaction tube 525 was Inconel 600, 5.08 cm (2 in.) Schedule 40. The separator 522 was a cyclone separator. The reaction system was designed for a production of inorganic material powder of 1 kg/hr.

The connection of the carrier gas inlet 20 to the reaction vessel 12 had a rectangular cross section.

In operation, the reaction vessel was rotated at about 15 rpm in a direction counter to the carrier gas vortex. Carrier gas was air flowing through the reaction vessel 12 at a volume flow rate of from about 19 L/sec (40 cf/min) to about 24 L/sec (50 cf/min), measured at a temperature of about 30° C. The feed was a solution of metal nitrates in the correct proportion to yield 1 mole of $La_{0.70}Ca_{0.31}CrO_3$ per liter of solution. Also dissolved in the feed solution was glycine at the stoichiometric proportion, calculated to yield complete combustion, as discussed in REDOX EFFECTS IN SELF-SUSTAINING COMBUSTION SYNTHESIS OF OXIDE CERAMIC POWDERS, L A Chick, G D Maupin, G L Graff, L R Pederson, D E McCready and J L Bates, Mat. Res. Soc. Symp. Proc. Vol. 249, 1992. The carrier gas was heated to between 190° C. to 200° C. as monitored by thermocouple T2. Furnace control temperature T3 was about 750° C. The metal temperature T4 of the bearing 530 was about 270° C. The carrier gas exit temperature T5 was about 360° C. The outlet 24 temperature T6 was about 450° C. The carrier gas entering the separator 522 had a temperature of about 290° C. T7. The separator carrier gas outlet temperature T8 was about 140° C. The collection reactor tube 525 temperature T9 was about 1000° C.

Processing in reactors resulted in a yield of about 85% of theoretical weight of an inorganic material powder composition of $La_{0.70}Ca_{0.31}CrO_3$ ($LCC_{31}$).

Inorganic material powder product was calcined in air for 0.5 hour at 650° C. Pellets were made by sintering the calcined powder at 1250° C. for 1 hour.

A second group of pellets were made using a beaker type batch apparatus.

Figure 7:
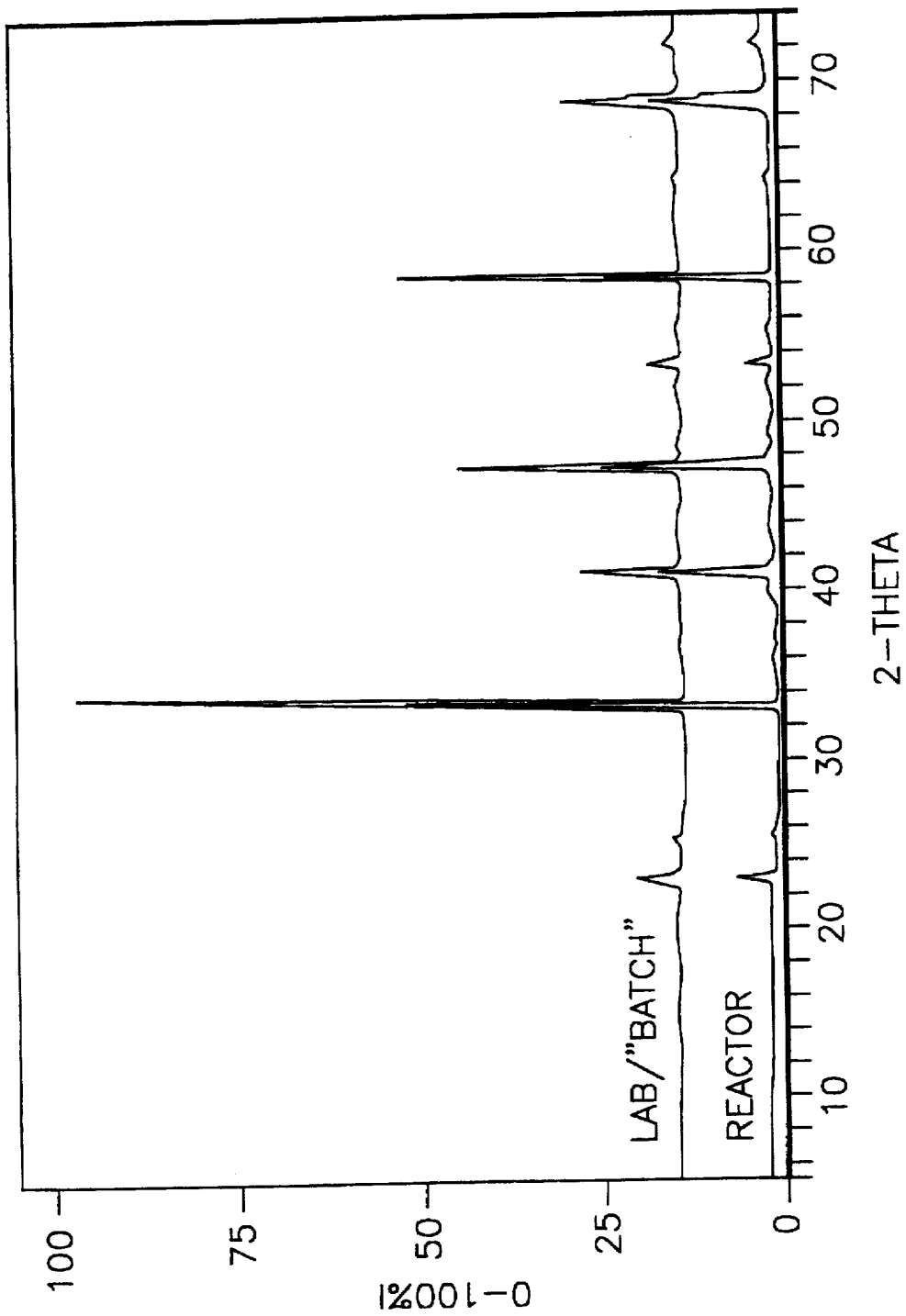
FIG. 7 is a comparison of X-ray diffraction patterns of inorganic material product made with the present invention and by a known batch apparatus.
Figure 8:
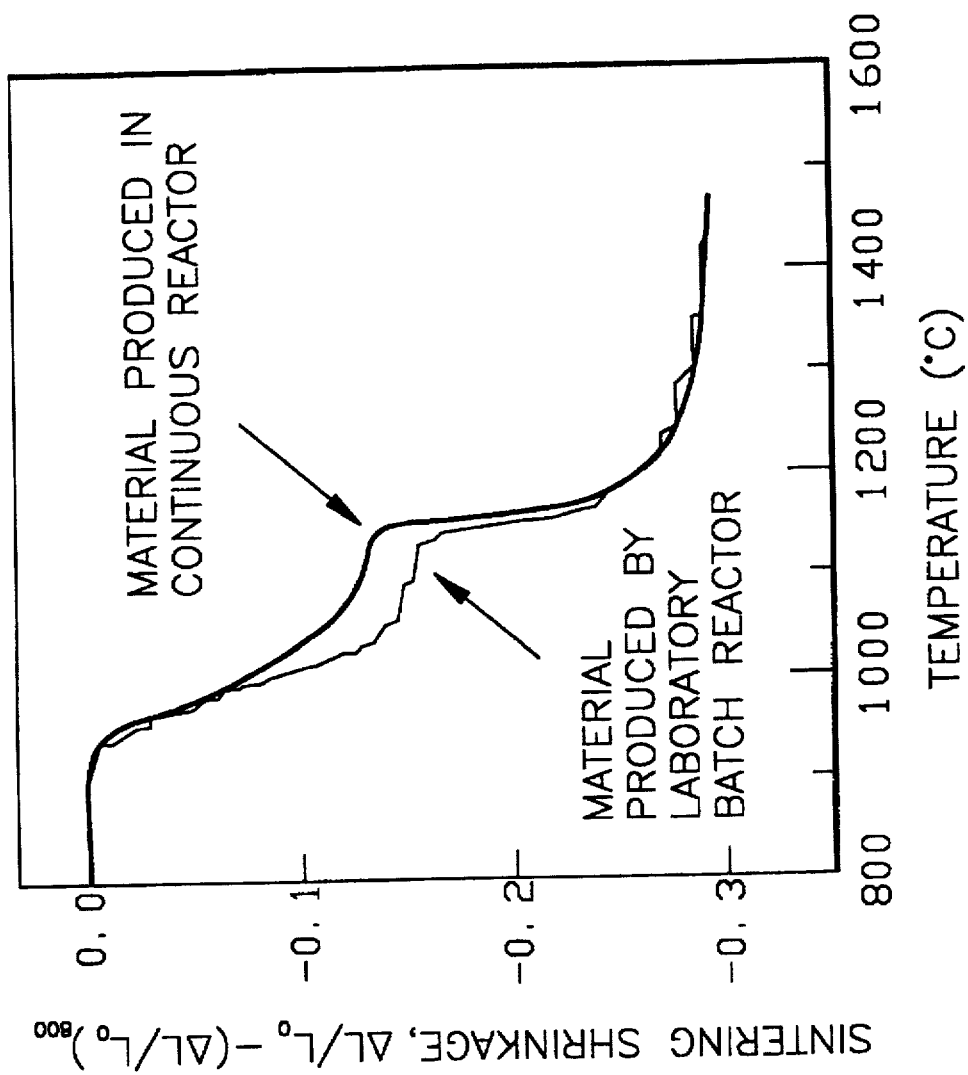
FIG. 8 is a comparison of sintering characteristics of inorganic material product made with the present invention an by a known batch apparatus.

The continuous apparatus pellets were compared to the batch apparatus pellets with X-ray diffractograms (FIG. 7) and sintering shrinkage diagrams (FIG. 8), showing that the compositions were substantially identical as well as the sintering characteristics.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A reactor for combustion synthesis of inorganic powders, comprising:
   (a) a reaction vessel having a length, inner surface, and a first end and a second end;
   (b) a solution inlet into the reaction vessel said solution inlet in relationship with respect to said inner surface wherein said solution admitted through said solution inlet initially flows in contact with said inner surface;
   (c) a carrier gas inlet into the reaction vessel;
   (d) a heater for heating both the solution and the carrier gas; and
   (e) a drive for rotating the reaction vessel.

2. The reactor as recited in claim 1, wherein the solution inlet is a plurality of solution inlets.

3. The reactor as recited in claim 1, wherein the carrier gas inlet has a longitudinal axis oriented substantially perpendicular to a reaction vessel longitudinal axis and said carrier gas inlet is tangential to said reaction vessel.

4. The reactor as recited in claim 1, wherein the solution flows helically along the inner surface.

5. The reactor as recited in claim 1, further comprising:
   a powder collection system.

6. The reactor as recited in claim 5, wherein the powder collection system comprises:
   (a) a separator for separating inorganic material powder from the carrier gas;
   (b) a collection reaction tube for receiving inorganic material powder from the separator; and
   (c) a collection vessel receiving the inorganic material powder from the collection reaction tube.

7. The reactor as recited in claim 1, wherein the heater heats both a carrier gas upstream of the carrier gas inlet and the reaction vessel.

8. The reactor as recited in claim 1, wherein the reactor vessel is cylindrical.

9. A reactor for combustion synthesis of inorganic powders, comprising:
   (a) a reaction vessel having a length, inner surface, and a first end and a second end;
   (b) a solution inlet into the reaction vessel said solution inlet in relationship with respect to said inner surface wherein said solution admitted through said solution inlet initially flows in contact with said inner surface;
   (c) a carrier gas inlet into the reaction vessel, said carrier gas inlet having a longitudinal axis oriented substantially perpendicular to a reaction vessel longitudinal axis and a carrier gas flows in a vortex through the reactor vessel;
   (d) a heater for heating both the solution and the carrier gas; and
   (e) a drive for rotating the reaction vessel.

10. The reactor as recited in claim 9, wherein said heater further comprises:
    a heater located outside the reaction vessel; and a second heater located upstream of the carrier gas inlet.

11. The reactor as recited in claim 10, further comprising:
    a powder collection system having a separator and a collection reaction tube.

12. The reactor as recited in claim 10, wherein the reaction vessel is cylindrical.

* * * * *